United States Patent [19]
Kujas

[11] Patent Number: 4,588,657
[45] Date of Patent: May 13, 1986

[54] SOLDER COMPOSITION

[75] Inventor: Erich F. Kujas, Philadelphia, Pa.

[73] Assignee: RCA Corporation, Princeton, N.J.

[21] Appl. No.: 667,159

[22] Filed: Nov. 1, 1984

[51] Int. Cl.[4] .................. B32B 15/01; C22C 13/00
[52] U.S. Cl. ................................ 428/641; 428/647; 420/558; 219/85 H; 228/263.11
[58] Field of Search ........ 420/558; 219/85 H, 146.22; 228/223, 224, 263.11, 263.18; 428/647, 641

[56] References Cited

U.S. PATENT DOCUMENTS 3,103,067  9/1963  Dixon .................... 29/473.1
3,793,161  2/1974  Manko .................... 204/43 S

FOREIGN PATENT DOCUMENTS 718982  11/1954  United Kingdom ............ 420/588

Primary Examiner—L. Dewayne Rutledge
Assistant Examiner—Deborah Yee
Attorney, Agent, or Firm—Birgit E. Morris; Edward J. Sites

[57] ABSTRACT

A solder is disclosed which consists essentially of from about 55 to about 65 percent by weight of tin, from about 2 to about 3.9 percent by weight of calcium with the remainder being lead. The calcium modified tin-lead solders of this invention are characterized by excellent soldering properties, especially uniform solidification on cooling, and by forming solder joints with a tensile strength of at least about 7000 PSI (49.21×10[5] kg/sq m).

7 Claims, 1 Drawing Figure

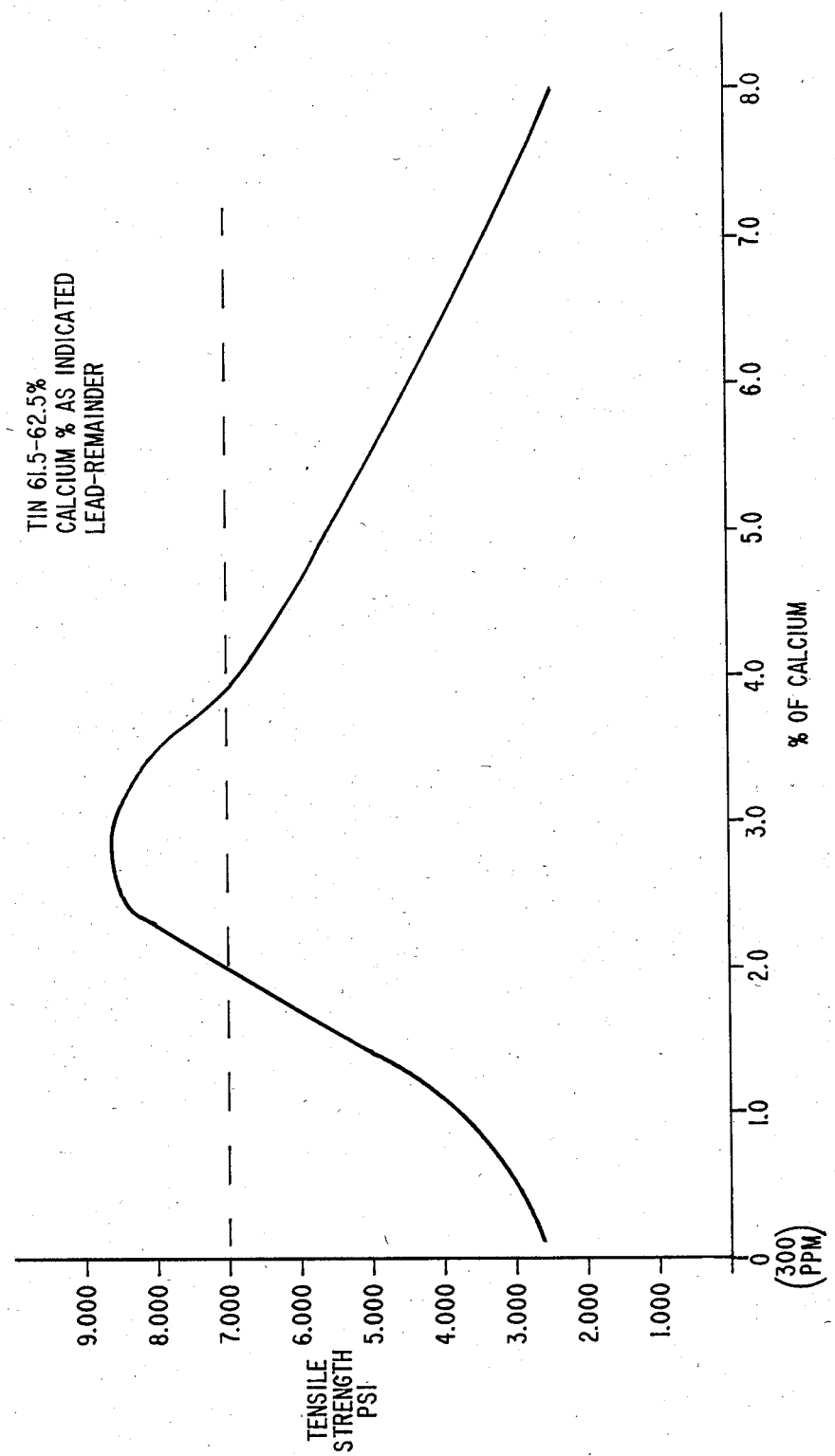

SOLDER COMPOSITION

This invention relates to novel solders and more particularly is concerned with base metal solders which have excellent soldering properties similar to those of silver modified tin-lead solders and unexpectedly high tensile strength as compared to silver modified tin-lead solders.

BACKGROUND OF THE INVENTION

A solder can be broadly defined as being a fussible metal alloy composition which is used to bond material together. Solders having distinctly different properties can be obtained by using different combinations of metals and by varying the relative proportions of each metal in the solders. The most commonly used solders are binary compositions with the most widely used binary solders being comprised of tin and lead. The relative amounts of the tin and lead in tin-lead solders can be varied over wide ranges with most of the tin-lead solders which are commonly employed containing between 40 and 60 percent by weight of tin with the remainder being lead. Tin-lead solders have wide commercial applications, with lead-rich solders being employed in the plumbing arts and tin-rich solders being extensively employed in the electronic arts, such as in the wave soldering of printed circuit boards and the like.

The binary solders comprised of tin and lead, while satisfactory for many applications, are not suitable for certain specialized applications. In these applications, it has been recognized that the addition of relatively minor amounts of one or more additional metals to the tin-lead solders can impart to the resulting solder composition the properties required for the specialized applications.

One particular well-known class of modified tin-lead solders contains as an additive metal a few percent by weight of silver. A typical solder of this type is comprised of 61.5 to 62.5 percent by weight of tin, 1.75 to 2.25 percent by weight of silver, with the remainder being lead. The silver modified tin-lead solders are employed extensively in soldering silver contacts of electrical and electronic components. The silver in the tin-lead solders prevents the silver from the silver contacts of the electrical and electronic components from being leached into the solder. In addition, the silver modified solders have other desirable properties required for certain applications, such as excellent thermal and electrical conductive properties as well as excellent resistance to thermal fatigue caused by the frequent substantial changes in temperature. The wetting out and flow properties of silver modified tin-lead solders during soldering are quite good, and the silver modified tin-lead solders are also more resistant to corrosion than the binary tin-lead solders.

The silver modified tin-lead solders have not, however, proved to be completely satisfactory. One major problem encountered with the silver modified tin-lead solder is that unequal solidification is often encountered on cooling of solder joints made with silver modified tin-lead solders. When unequal solidification is encountered, the resultant solder joints will have areas with different amounts of stress which can cause mechanical failure if not corrected. To correct the problem of unequal solidification, the soldered assemblies are subjected to a series of reheating steps at elevated temperatures. The reheating process is both costly and the repeated heating to the required elevated temperatures can damage sensitive electronic components.

The tensile strength of the joints made with silver modified tin-lead solders is a further area of concern. The tensile strength of the silver modified tin-lead solder joints as formed is typically about 7000 PSI ($49.21 \times 10^5$ kg/sq m) which is marginally for many applications, especially in spacecraft applications. A further problem with the silver modified tin-lead solders is that the silver, because of its high price per ounce, adds significantly to the material cost of the solders.

What would be highly advantageous would be a solder comprised of base metals having the same or improved desirable properties as the silver modified tin-lead solders and paticularly a base metal solder having improved solidification properties and higher tensile strength as compared to silver modified tin-lead solders.

SUMMARY OF THE INVENTION

It has been found that solders consisting of essentially about 55 to 65 percent by weight of tin, 2 to 3.9 percent by weight of calcium, with the remainder being lead, have all the desirable properties of silver modified tin-lead solder and further have superior solidification properties and about the same or substantially higher tensile properties.

BRIEF DESCRIPTION OF THE DRAWING

The FIGURE is a graphic representation showing the advantageous effect on the tensile properties obtained by adding calcium to a tin-lead solder.

DETAILED DESCRIPTION

The solders of this invention contain from about 55 to about 65 percent by weight of tin with optimum results being obtained with from about 61.5 to about 62.5 percent by weight of tin. The amount of tin employed in the solders of this invention is selected so the resulting solders will have excellent soldering properties, such as flow and wetting out properties and the resultant solder joints will have excellent tensile strength. If the solder of this invention contains substantially less or substantially more tin than that specified above, there is a very definite drop in the tensile strength.

The solders of this invention also contain calcium in an amount from about 2 to 3.9 percent by weight. More preferably, the solders contain from about 2.4 to about 3.2 perent by weight of calcium with the optimum results being obtained with about 2.8 percent by weight of calcium.

The relative amounts of calcium added to the solders of this invention are critical in order to achieve the desired satisfactory soldering properties and to form solder joints having a tensile strength of at least 7000 PSI ($49.21 \times 10^5$ kg/sq m), such as is obtained with the silver modified solder compositions. The criticality of range for calcium in the solder is best illustrated in the FIGURE. A series of calcium modified tin-lead solders were prepared by alloying together 61.5 to 62.5 percent by weight of tin, various amounts of calcium from 300 PPM to 8 percent by weight with the remainder of each composition being lead. As can be seen in the FIGURE, in order to obtain a minimum tensile strength of about 7000 PSI ($49.2 \times 10^5$ kg/sq m) from about 2 to about 3.9 percent by weight of calcium is required. The tensile strength of solders containing only 300 PPM of calcium were extremely low, being in the range of about 2500 PSI (12.58×10⁵ kg/sq m). Even more surprising, the tensile strength of solders containing, for example, 8 percent by weight of calcium were likewise quite low, being in the same 2500 PSI (12.58×10⁵ kg/sq m) range as the solders containing only 300 PPM of calcium.

It was further found that if the calcium was added in the slightly narrower range of about 2.4 to 3.2 percent by weight, that the tensile strength was markedly improved to about 8200 PSI (57.64×10⁵ kg/sq m) or higher. This increase in tensile strength amounts to over a 17 percent improvement as compared to the tensile strength obtained in silver modified tin-lead solders. Furthermore, as can be seen in the FIGURE, by controlling the amount of calcium to about 2.8 percent by weight tensile strength of about 8400 PSI (59.05×10⁵ kg/sq m) can be achieved with the solders of this invention.

The remainder of the solders of this invention consists essentially of lead. The lead is present in the solder in an amount which compliments the other metals present in the solder and particularly, the tin. The lead, in combination with the tin, forms a eutetic composition and the combination of the tin, lead and calcium results in tensile strength of the solder joints which are substantially higher than that obtainable with either tin or lead alone in combination with calcium.

Preferably, the solders of this invention should consist of only pure tin, lead and calcium in order to obtain consistent satisfactory results. It is, however, possible to have minor amounts of other metals or non-metallic materials in the solders, either as impurities or as additives, provided the additional materials are either inert or do not adversely affect the desireable property of the solders of this invention. Certain metals however, should not be added to the solders of this invention. In particular, other alkaline earth metals, that is, other than calcium; and, in particular, magnesium should not be added to the solders. Surprisingly, it has been found that the calcium modified tin-lead solders of this invention are highly resistant to corrosion, while solders containing the specified amounts of other alkaline earth metals and particularly, magnesium, under even relatively mild conditions will readily corrode and thereby weaken the solder joints and reduce the electrical conductivity. Certain other metals, such as copper, should likewise be strictly limited in amount or completely eliminated from the solders of this invention. Copper substantially reduces the alloying properties of the solder at the interface with the material being bonded together and thereby reduces the tensile strength of the solder joints.

It has been found that the calcium modified tin-lead solders of the present invention are at least equivalent to silver modified tin-lead solders heretofore specified for special applications, such as in spacecraft and the like. The calcium modified tin-lead solders were compared with the equivalent silver modified solders. The results which were obtained are set forth in the following chart:

|  | Silver Modified Solder | Calcium Modified Solder |
| --- | --- | --- |
| Composition |  |  |
| tin | 61.50-62.50% | 61.50-62.50% |
| silver | 1.75-2.25% | 0 |
| calcium | 0 | 1.75-2.25% |
| lead | remainder | remainder |
| Properties |  |  |

-continued

|  | Silver Modified Solder | Calcium Modified Solder |
| --- | --- | --- |
| max. tensile strength of solder joint | 7000 PSI (49.21 × 10⁵ kg/sq m) | 8400 PSI (59.05 × 10⁵ kg/sq m) |
| density | 11.6 lb/cu in (316.5 gm/cu cm) | 11.7 lb/cu in (323.9 gm/cu cm) |
| electrical conductive % of copper | 11.6 | 11.7 |
| thermoconductivity watts/cm celsius | .31 | 31.5 |

The calcium modified tin-lead solders of this invention, in addition to having increased tensile strength versus the silver modified solders, likewise have the same or slightly better soldering properties. The calcium modified solders of this invention flow well and are exceptionally good in wetting out both metallic and non-metallic materials. It was found, for example, a silicon solar cell could readily be soldered to silver coated support arrays using the calcium modified tin-lead solders of this invention. In addition, the electrical conductivity of the solders of this invention was the same or slightly higher than the silver modified solders in which silver is added, for among other reasons, to increase electrical conductivity. The material cost of the soldering assemblies is substantially reduced using the calcium modified tin-lead solders of this invention in place of silver modified tin-lead solders. More surprising, however, it was found that the calcium modified tin-lead solders exhibited exceptionally uniform solidification on cooling thereby eliminating the reheating steps required with silver modifid tin-lead solders.

The calcium modified tin-lead solders of this invention meet or exceed even the stringent requirement for soldering of electrical and electronic components which heretofore require silver modified solders and in particular, improves the tensile strength while reducing the cost of the soldering operation.

What is claimed is:

1. A solder composition consisting essentially of from about 55 to about 65 percent by weight of tin, from about 2 to about 3.9 percent by weight of calcium with the remainder of the composition being lead.

2. The solder composition according to claim 1 wherein tin is present in the composition in an amount of from about 61.5 to about 62.5 percent by weight.

3. The solder composition according to claim 1 wherein calcium is present in the composition in an amount of from about 2.4 to about 3.2 percent by weight.

4. The solder composition according to claim 1 wherein the calcium is present the composition in an amount of about 2.8 percent by weight.

5. The solder composition according to claim 1 wherein the tin is present in the composition in an amount from about 61.5 to 62.5 percent by weight and wherein the calcium is present in the composition in an amount of about 2.4 to about 3.2 percent by weight.

6. The solder composition according to claim 1 wherein the tin is present in the composition in an amount of about 61.5 to about 62.5 percent by weight and the calcium is present in the composition in an amount of about 2.8 percent by weight.

7. A solder joint comprised of materials bonded to each other with a solder consisting essentially of from about 55 to about 65 percent by weight of tin from about 2 to about 3.9 percent by weight of calcium and the remainder being lead and having a tensile strength as formed of at least 7000 PSI (49.21×10⁵ kg/sq m).

* * * * *